United States Patent
Imajyo

[15] 3,699,489
[45] Oct. 17, 1972

[54] CURRENT LIMITING DEVICE

[72] Inventor: Yasutaka Imajyo, Tokyo, Japan

[73] Assignee: Tokyo Shibaura Electric Company, Ltd., Kawasaki-shi, Japan

[22] Filed: March 17, 1971

[21] Appl. No.: 125,304

[30] Foreign Application Priority Data

Mar. 28, 1970 Japan ............... 45/25624
Mar. 28, 1970 Japan ............... 45/25626

[52] U.S. Cl. .......................... 337/221, 337/121
[51] Int. Cl. ................................. H01h 87/00
[58] Field of Search ....... 337/21, 114, 115, 116, 117, 337/118, 119, 121, 159

[56] References Cited

UNITED STATES PATENTS 3,559,138  1/1971  Itoh et al. .............. 337/21
3,501,730  3/1970  Ito et al. ............. 337/21 UX

FOREIGN PATENTS OR APPLICATIONS 1,513,333  10/1969  Germany .............. 337/21
863,354    3/1941   France ............... 337/119

Primary Examiner—Bernard A. Gilheany
Assistant Examiner—Dewitt M. Morgan
Attorney—Oblon, Fisher & Spivak

[57] ABSTRACT

A current limiting device includes a casing containing a liquid metal sealed therein, the same being highly electrically conductive in its liquid state and highly non-conductive in its vaporized state. The casing is provided with a ceramic tube, a pair of tubular terminal caps sealingly mounted on the opposite ends of the ceramic tube and a pair of bellows secured to the ends of the terminal caps such that the inside of the bellows will communicate with the inside of the terminal caps. A buffer device is provided in the terminal caps for reducing the energy of the high vapor pressure of the vaporized liquid metal which may occur in the casing when a heavier fault current will be interrupted due to the vaporization of the liquid metal. Thus, any damage of the bellows which may result from the high vapor pressure of the vaporized liquid metal is effectively reduced.

4 Claims, 7 Drawing Figures

PATENTED OCT 17 1972 3,699,489

INVENTOR
YASUTAKA IMAJYO

BY *Ottor, Fisher & Spivak*
ATTORNEYS

CURRENT LIMITING DEVICE

BACKGROUND OF THE INVENTION

1. Field of the Invention

The present invention relates to a current limiting device which includes a casing containing a liquid metal sealed therein that is highly electrically conductive in its liquid state and highly nonconductive in its vaporized state.

2. Description of the Prior Art

In the past, liquid metal contained current limiting devices have usually been composed of a casing which includes a ceramic tube having an opening extending longitudinally therethrough for providing a restricted current path, tubular terminal caps for providing a tight fluid seal on the opposite ends of the ceramic tube, metallic bellows mounted on the terminal caps for enabling communication of the inside thereof with the inside of the terminal caps, and a liquid metal enclosed in a space of the casing. The aforesaid liquid metal was generally selected from either a sodium potassium alloy (NaK), mercury (Hg) or gallium (Ga).

The current limiting device was located in an electric power circuit and in series therewith such that the same was connected between one terminal of an electric supply and a circuit protecting breaker connected to an electric load. When a fault such as a severe short circuiting would occur in the load circuit, a high excess current would flow through the liquid metal in the restricted path of the current limiting device, whereby the liquid metal would be self-heated and change from its liquid state to its vaporized state. As a result thereof, a metal vapor having a high resistance would remain in the restricted current path in lieu of the liquid metal. The fault current flowing through the current limiting device would thus be reduced, and an interruption of the load circuit from an electric voltage supply would be easily achieved by the circuit breaker.

While somewhat satisfactory, one important problem resulting from a metal vapor of an extremely high pressure level has remained in the prior art. As is well known, the volume expansion of a liquid metal due to the vaporization thereof may occur rapidly under a heated condition and as a result thereof an extreme increase in metal vapor volume will occur. By way of example, the situation with regard to mercury (Hg) will be referred to in typifying the aforesaid volume expansion. 1 mol of mercury occupies a volume of 15 cm$^3$ in its liquid state, while on the other hand it occupies a volume of 22.4 (liters) in its standard vapor state. Accordingly, the volume expansion of mercury is about 1,500 times that at its standard condition (STP). The mercury in its liquid state will normally be located in the restricted current path of the current limiting device, and the same may suffer heating from an electric arc of about 6,000° C upon the interruption of a fault current. There may also be 10 times the volume expansion of mercury due to the temperature changing from its cooling point of 357° C to an arc temperature of 6,000° C, and accordingly, all of the volume expansion of mercury may be 15,000 times.

In this manner, an extremely high pressure such as several orders of magnitude of that of atmospheric pressure may be added onto an inner surface of the casing of the current limiting device. The energy of the highly pressurized metallic vapor will be transferred from its origin to the other portions in the casing of the current limiting device, and be absorbed by the volume expansion of the bellows attached to the terminal caps of the current limiting device.

However, because the shock energy of the metallic vapor is extremely high, damage may occur to the metallic bellows which are used as shock absorbers.

The metallic bellows of the type made for the aforesaid purpose may by way of example have an external diameter of 20 mm and a thickness of 0.1 mm and can resist against a pressure of 6.3 Kg/cm$^2$. Similar bellows having the same external diameter and a thickness of 0.2 mm can resist against a pressure of 27 Kg/cm$^2$. Such bellows have been found to be unsatisfactory as shock absorbers for current limiting devices when subjected to the high pressures described above.

SUMMARY OF THE INVENTION

Accordingly, it is an object of the present invention to provide a new and improved unique current limiting device in which any pressure shock to be added to the bellows thereof is effectively reduced to thereby prolong the life of the current limiting device.

Another object of the present invention is to provide a new and improved unique current limiting device wherein it is possible to effectively prevent the re-ignition of an electric arc after an interruption of fault current.

Briefly stated, in accordance with one embodiment of the present invention, these and other objects are attained by the provision of a current limiting device which includes a casing containing a liquid metal sealed therein which is highly electrically conductive in its liquid state and highly non-conductive in its vaporized state. The casing is composed of a ceramic tube having an opening extending longitudinally therethrough to form a restricted current path, terminal caps sealingly mounted on the opposite ends of the ceramic tube, bellows secured to the ends of the terminal caps to enable the inside thereof to communicate with the insides of the terminal caps, and buffer devices provided in the terminal caps to respectively reduce the shock pressure to be added on the inside surfaces of the bellows upon the vaporization of the liquid metal in the restricted current path of the ceramic tube when a heavier fault current is interrupted.

BRIEF DESCRIPTION OF THE DRAWINGS

The present invention will be more fully understood from the following description when taken in connection with reference to the accompanying drawings, wherein.

DETAILED DESCRIPTION OF THE PREFERRED EMBODIMENTS

Figure 1:
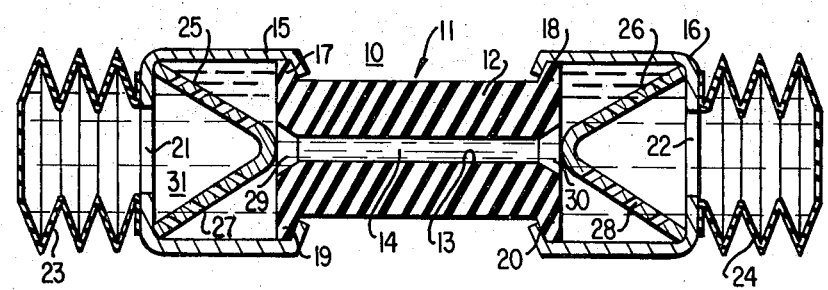
FIG. 1 is a sectional view of one embodiment of a current limiting device according to the present invention.

Referring now to drawings, wherein like reference numerals designate identical or corresponding parts throughout the several views, and more particularly to FIG. 1 thereof, wherein a current limiting device is generally shown with a reference numeral 10, and the same includes a casing 11.

The casing is composed of a ceramic tube 12 having a central opening 13 which extends longitudinally therethrough to form a restricted current path 14 and tubular shaped terminal caps 15 and 16 made of an electrically conductive material. Flanged portions 17 and 18 are provided at opposite ends of the ceramic tube 12 for securely engaging the respective flanges 19 and 20 of the terminal caps 15 and 16 therewith. In order to prevent any leakage within the casing of a liquid metal or metallic vapors from the joined portions of the aforesaid flanges a conventional fluid tight seal, such as an adhesive seal, is provided.

The terminal caps 15 and 16 are respectively provided with openings 21 and 22 at one end thereof. Additionally, metallic bellows 23 and 24 respectively secured to the peripheral edges of the openings 21 and 22 by welding or the like. It should thus be understood that the caps and bellows will communicate with each other through the openings 21 and 22.

Conically shaped buffers 25 and 26, each of which have a plurality of respective orifices 27 and 28 and which are made of a metallic plate, are mounted within the respective terminal caps 15 and 16 in such a fashion that the tops of the conical buffers 25 and 26 are directed towards the open ends of the restricted current path 14 and are located at a position spaced somewhat away therefrom. It should be understood that at the bottom edges of the conical buffers 25 and 26 are a plurality of legs (not shown) which protrude therefrom, and that the legs are inserted into notches (not shown) provided on the terminal caps 15 and 16 and welded thereto. With such an arrangement, the buffers 25 and 26 will be in the position as shown. At the respective open ends of the restrictive current path 14 nozzles 29 and 30 are provided and the same spread out towards the rounded top of the conical buffers 25 and 26.

A liquid metal 31, such for example, as NaK, Hg, Ga or the like, which is electrically highly conductive in the liquid state and highly non-conductive in a vaporized state, is filled in the entire space within the casing 11 in such a fashion so as not to add any stress to the bellows 23 and 24 at a normal operating temperature.

The current limiting device 10 is connected to an electric power circuit by inserting terminal caps 15 and 16 into corresponding terminal clips (not shown) provided in the circuit. The current limiting device 10 is located in the electric power circuit such that the electric current will flow in turn from one terminal of an electric power supply through the current limiting device 10, a protecting circuit breaker (not shown), an electric load and then to the other terminal of the electric power supply.

Upon a normal operation, the temperature rise of the liquid metal 31 in the casing will be small and the vaporization of the liquid metal will therefore not occur.

However, when a severe short circuit occurs in the load circuit, an extremely large fault current will flow through the liquid metal 31 in the casing 11, and accordingly the liquid metal 31 will be self-heating thereby. In this case, it can be seen that the current density within the restricted path 14 will become larger than that within the caps 15 and 16 because of the smaller sectional area of the restricted current path 14. As a result thereof, the liquid metal located within the restricted current path 14 will be self-heated rapidly and be vaporized.

Thus, the liquid metal 31 in the restricted current path 14 will be rapidly changed from the liquid phase to the vapor phase and thereby greatly increase the electric resistance of the restricted current path 14. In such a manner, the fault current caused by the short circuit will be limited to a lower amplitude easily capable of interruption by the protecting circuit breaker.

Figure 2:
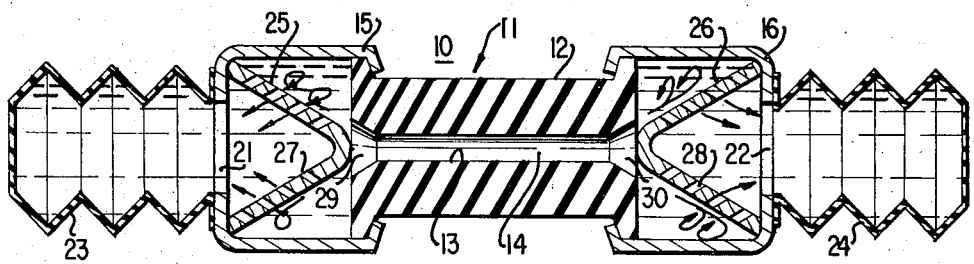
FIG. 2 is a view similar to that of FIG. 1 for illustrating current interruption due to the vaporization of a liquid metal.

Referring now to FIG. 2, it can be seen that the liquid metal 31 within the restricted current path 14 has disappeared therefrom due to the vaporization of the same. Upon the vaporization of the liquid metal, a metallic vapor having a higher pressure in the restricted current path 14 will occur and the pressurized vapor will gush out at the open ends 29 and 30 of the path 14 and eject into caps 15 and 16. The metallic vapor so ejected into the caps 15 and 16 will move against the rounded top of the conical buffers 25 and 26 along the conical surface thereof and then move onto the inner surface of the caps 15 and 16 thereby generating a turbulence flow as shown with arrows. The metallic vapor will then move into the bellows 23 and 24 through the orifices 27 and 28 and the openings 21 and 22, such that the resulting volume expansion of the vapor will be absorbed by the volume expansion of the bellows 23 and 24.

It should be understood that during the above operation the energy of the metallic vapor will be greatly reduced so that when the reduced pressure is added to the bellows 23 and 24 damage of the same will be prevented effectively.

Figure 3:
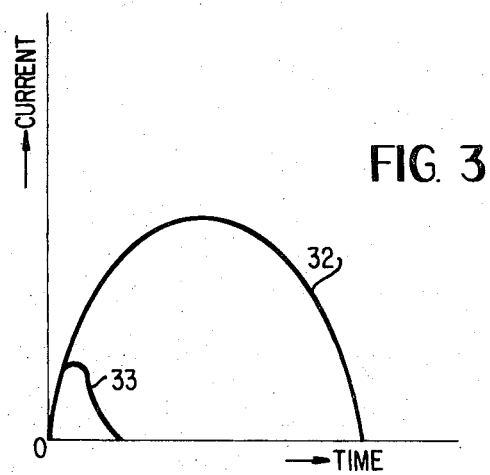
FIG. 3 is a diagram of a curve showing the current reducing characteristics of the current limiting device in accordance with the present invention.

FIG. 3 shows waveforms of an A.C. fault current for a half cycle with the abscissa being represented by time and the ordinate being represented by current amplitude. It will be understood that in the absence of the current limiting device 10 of the present invention, a protecting circuit breaker must interrupt the larger and naturally occurring short circuiting current 32. On the other hand when the limiting device 10 of the present invention is connected in series to the breaker, the breaker can operate by interrupting only the smaller fault current 33 which has been effectively reduced by the current limiting device.

After circuit interruption occurs, the vaporized liquid metal will gradually be returned from its vaporized state to its liquid state due to the cooling thereof and the restricted current path will again be filled with the liquid metal for provision of the next fault current interruption. Likewise, after circuit interruption the expanded bellows, as shown in FIG. 2, will also shrink to the size as shown in FIG. 1.

Figure 4:
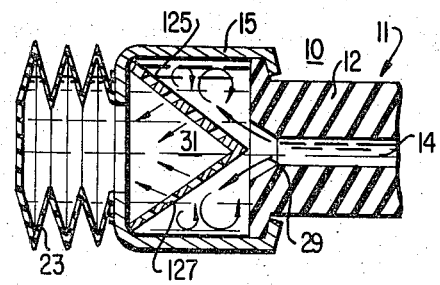
FIG. 4 is a sectional view, partly broken away, of another alternative embodiment of the present invention.

In another and alternative embodiment shown in FIG. 4, the conical buffer 125 is seen as having a pointed top which is faced opposite to the open end 29 of the restricted current path 14. Orifices 127 are provided on the conical surface of the buffer 125. The pressurized metallic vapor generated in the path 14 will be ejected from the open end 29 of the path 14 and then move onto the top portion of the conical buffer 125. The metallic vapor will then move along the conical surface of the buffer 125, and then onto the inner surface of the cap 15 such that a turbulence flow is generated as shown with arrows. The metallic vapor will then move into the bellows 23 through the orifices 127 and be absorbed by the volume expansion of the metallic vapor due to the volume expansion of the bellows 23.

Figure 5:
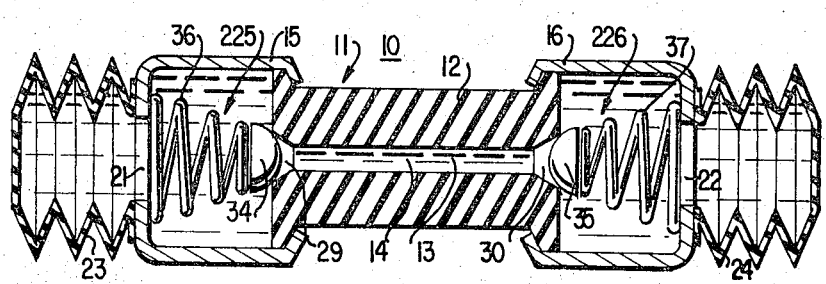
FIG. 5 is a sectional view of a further alternative embodiment of the present invention.

In accordance with a further alternative embodiment shown in FIG. 5, the buffer devices 225 and 226 respectively provided within the terminal caps 15 and 16 are seen to respectively include metallic hemispheres 34 and 35 which normally rest and close the open end of the restricted current path 14 by coiled spring members 36 and 37 which are positioned between the hemispheres and the peripheral edge of the openings 21 and 22 of the caps 15 and 16.

Figure 6:
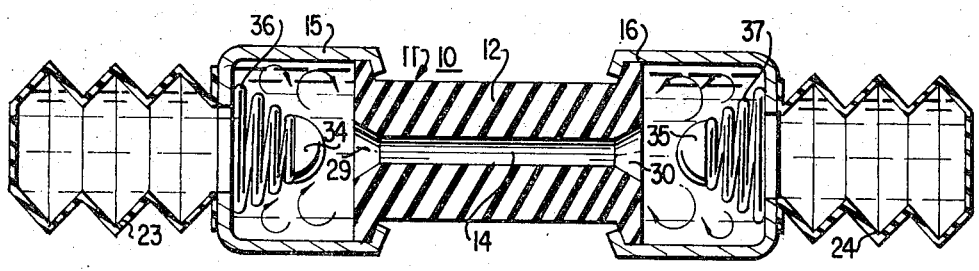
FIG. 6 is a view similar to that of FIG. 5 for illustrating current interruption.

As shown in FIG. 6, when vaporization of the liquid metal occurs within the restricted current path 14 due to the flow of a severe short circuiting current, then since the metallic vapor will have an extremely high pressure level the same will cause the hemispheres 34 and 35 to move against the biasing force of springs 36 and 37 from their resting position on the ends 29 and 30. The metallic vapor will then be ejected into the terminal caps 15 and 16 and a turbulence flow of the metallic vapor will be generated therein. It should be understood that the turbulence flow of the metallic vapor will be generated in the caps 15 and 16 in a manner similar to that of FIGS. 1 and 2, such as to reduce the energy of the metallic vapor.

In accordance with this embodiment, when the current limiting function has been achieved and the pressure has become uniform in the casing 11, the hemisphere members 34 and 35 will again close the open ends 29 and 30 by the biasing force of the springs 36 and 37 to prevent the liquid metal from rapidly flowing into the restricted current path 14. Accordingly, the reignition of an electric arc, which may occur in the restricted current path 14, can be effectively eliminated.

Figure 7:
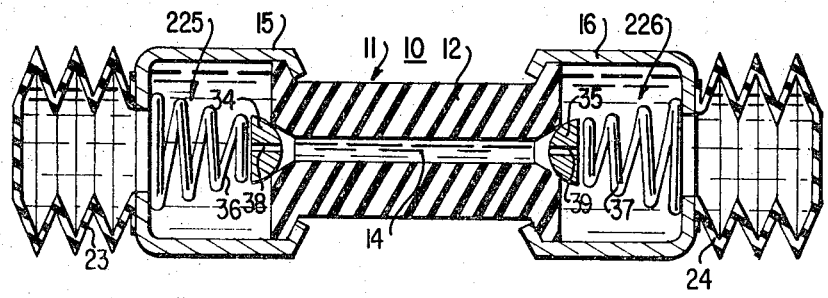
FIG. 7 shows a sectional view of still another alternative embodiment of the current limiting device in accordance with the present envention.

In accordance with a still further embodiment shown in FIG. 7, hemisphere members 34 and 35 are provided with respective orifices 38 and 39 for enabling the inside of the caps 15 and 16 to communicate with the restricted current path 14.

Thus, when the current limiting function has been completed and the pressure has become uniform in the casing 11, the liquid metal will be slowly introduced into the restricted current path 14 by a limited volume through the orifices 38 and 39 of the hemispheres 34 and 35 to thereby prevent a rapid making of the electric power circuit in the restricted current path 14. In this way, the current limiting device 10 can be provided for the safe interruption of fault current without the reignition of electric arc.

Obviously, many modifications and variations of the present invention are possible in the light of the above teachings. It is therefore to be understood, that within the scope of the teachings herein and the appended claims the invention may be practiced otherwise than as specifically described.

What is claimed as new and desired to be secured by Letters Patent of the United States is:

1. In a current limiting device having a casing filled with a liquid metal which is highly electrically conductive in its liquid state and highly non-conductive in its vaporized state, said casing comprising:
   a ceramic tube having a restricted current path extending longitudinally therethrough;
   a pair of terminal caps tightly mounted on the opposite ends of said ceramic tube, said terminal caps having an opening at one end thereof;
   metallic bellows secured to one end of each of said terminal caps to enable the inside thereof to communicate with the inside of said terminal caps through said openings thereof; and
   a buffer device mounted in each of said terminal caps and shaped so as to create a turbulent flow to reduce the energy of metallic vapor which is generated due to vaporization of said liquid metal in said restricted current path when a fault current of a high amplitude flows through the liquid metal in the restricted path, whereby the pressure stress to be added to said bellows is reduced.

2. A current limiting device according to claim 1, wherein: conical surface
   said buffer devices are formed of a metallic conical shape mounted in said terminal caps such that the top of the conical buffer is directed to an axially open end of said restricted current path in a somewhat spaced relation and the bottom portion of said buffer is secured to the inside wall of said terminal cap at one end thereof, said conical shaped buffer being provided with orifices on the conical surface thereof to cause the metallic vapor generated in said restricted current path to flow into said bellows.

3. A current limiting device according to claim 1, wherein:
   said buffer devices include a spherical member faced with an axially open end of said restricted current path and a bias spring is located between each of the spherical members and the inside wall of one of said terminal caps to urge the spherical members to normally close the open ends of the restricted current path, whereby the rapid return of liquid metal from the terminal caps into the restricted current path is prevented and the re-ignition of an electric arc in the restricted current path is avoided.

4. A current limiting device according to claim 3, wherein:
   said spherical members of said buffer devices include an orifice for enabling the inside of said restricted current path to communicate with the inside of said terminal caps, whereby a limited volume of metallic liquid flow is supplied from the inside of said terminal caps into the restricted current path to prevent re-ignition of an electric arc after every completion of current limitation.

* * * * *